(12) United States Patent
Flick et al.

(10) Patent No.: US 7,996,427 B1
(45) Date of Patent: Aug. 9, 2011

(54) UNIFIED SYSTEM FOR ACCESSING METADATA IN DISPARATE FORMATS

(75) Inventors: Christopher Lance Flick, San Jose, CA (US); Thai Wey Then, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 257 days.

(21) Appl. No.: 11/166,684

(22) Filed: Jun. 23, 2005

(51) Int. Cl.
*G06F 17/20* (2006.01)
*G06F 15/16* (2006.01)

(52) U.S. Cl. ........................................ 707/792; 719/328
(58) Field of Classification Search .................. 707/825, 707/792; 719/328
See application file for complete search history.

(56) References Cited

U.S. PATENT DOCUMENTS

| | | | |
|---|---|---|---|
| 6,651,072 B1 * | 11/2003 | Carino et al. ............... | 707/104.1 |
| 6,721,727 B2 * | 4/2004 | Chau et al. ........................ | 707/3 |
| 7,272,654 B1 * | 9/2007 | Brendel ......................... | 709/229 |
| 2002/0120634 A1 * | 8/2002 | Min et al. ...................... | 707/200 |
| 2003/0115219 A1 * | 6/2003 | Chadwick ..................... | 707/200 |
| 2005/0091186 A1 * | 4/2005 | Elish ................................. | 707/1 |

* cited by examiner

Primary Examiner — John Breene
Assistant Examiner — Alex Gofman
(74) Attorney, Agent, or Firm — Hickman Palermo Truong & Becker LLP

(57) ABSTRACT

A method and system for accessing media metadata from metadata stored in different native formats is disclosed. A repository contains a plurality of containers for storing media metadata, wherein a first container in the repository stores metadata in the first native format, and a second container in the repository stores metadata in the second native format. A set of routines is used to access all media metadata stored in the repository without regard to the native format in which the media metadata is stored. Each routine in the set of routines identifies a metadata item stored in a container through information passed in a set of parameters. The set of parameters comprises a reference to the repository, an identifier of a container in the repository, an identifier of a structure for a key for the identified native format, and a key.

24 Claims, 6 Drawing Sheets

FIG. 4A

| | MetaDataReference theMetaData | |
|---|---|---|
| | MetaDataItem | theItem = UninitializedMetaDataItem |
| | UInt8 | buffer[BUFFER_SIZE] |
| | | |
| 410A | UserDataStorageFormat = 'udta' | |
| | UserDataKeyFormat = 'udta' | |
| | Key = 'cprt' | |
| 420A | CopyMetaData(movie, &theMetaData) | |
| 430A | GetNextMetaDataItem(<br>theMetaData,<br>UserDataStorageFormat,<br>UninitializedMetaDataItem,<br>UserDataKeyFormat,<br>Key,<br>Sizeof(Key),<br>&theItem); | |
| 440A | GetMetaDataItemValue (<br>theMetaData<br>theItem,<br>buffer,<br>BUFFER_SIZE) | |

FIG. 4B

| | MetaDataReference theMetaData | |
|---|---|---|
| | MetaDataItem | theItem = UninitializedMetaDataItem |
| | UInt8 | buffer[BUFFER_SIZE] |
| | | |
| 410B | M4aStorageFormat = 'itms' | |
| | M4aKeyFormat = 'itlk' | |
| | Key[] = "com.apple.m4a.copyright" | |
| 420B | CopyMetaData(movie, &theMetaData) | |
| 430B | GetNextMetaDataItem(<br>theMetaData,<br>M4aStorageFormat,<br>UninitializedMetaDataItem,<br>M4aKeyFormat,<br>Key,<br>Sizeof(Key),<br>&theItem); | |
| 440B | GetMetaDataItemValue (<br>theMetaData<br>theItem,<br>buffer,<br>BUFFER_SIZE) | |

FIG. 4C

| | | |
|---|---|---|
| | MetaDataReference | theMetaData |
| | MetaDataItem | theItem |
| 410C | UserDataStorageFormat = 'udta' | |
| | UserDataKeyFormat = 'udta' | |
| | Key = 'cprt' | |
| | buffer = "This is the new copyright string" | |
| 420C | CopyMetaData(movie, &theMetaData) | |
| 430C | GetNextMetaDataItem(<br>theMetaData,<br>UserDataStorageFormat,<br>UninitializedMetaDataItem,<br>UserDataKeyFormat,<br>Key,<br>Sizeof(Key),<br>&theItem); | |
| 440C | SetMetaDataItemValue (<br>theMetaData,<br>theItem,<br>buffer,<br>sizeof(buffer)); | |

FIG. 4D

| | | |
|---|---|---|
| | MetaDataReference | theMetaData |
| | MetaDataItem | theItem = UninitializedMetaDataItem |
| 410D | Key = 'cprt' | |
| | Fr_FR[] = "fr_FR" | |
| | Locale[] = {0} | |
| 420D | CopyMetaData(movie, &theMetaData) | |
| 430D | GetNextMetaDataItem(<br>theMetaData,<br>UserDataStorageFormat,<br>theItem,<br>UserDataKeyFormat,<br>&Key,<br>Sizeof(Key),<br>&theItem); | |
| 440D | GetMetaDataItemProperty (<br>theMetaData,<br>theItem,<br>DataItemPropertyID_Locale,<br>Locale); | |
| 450D | if (strcmp(Locale, Fr_FR) == 0) then | |
| 460D | GetMetaDataItemValue (<br>theMetaData,<br>theItem,<br>buffer,<br>BUFFER_SIZE); | |
| 470D | else<br>loop back to 430D until end of copyright metadata items | |

FIG. 4E

| | MetaDataReference theMetaData | |
|---|---|---|
| | UInt8 buffer[BUFFER_SIZE] | |
| | MetaDataItem theItem = UninitializedMetaDataItem | |
| 420E | CopyMetaData(movie, &theMetaData) | |
| 430E | GetNextMetaDataItem(<br>  theMetaData,<br>  WildcardStorageFormat,<br>  UninitializedMetaDataItem,<br>  CommonKeyFormat,<br>  CommonCopyrightKey,<br>  Sizeof(CommonCopyrightKey),<br>  &theItem); | |
| 440E | GetMetaDataItemValue (<br>  theMetaData,<br>  theItem,<br>  buffer,<br>  BUFFER_SIZE) | |

UNIFIED SYSTEM FOR ACCESSING METADATA IN DISPARATE FORMATS

FIELD OF THE INVENTION

The present invention relates to accessing metadata associated with various types of media files, and in particular, to unified access to and management of media data metadata stored in one or more native format metadata containers in a metadata repository.

BACKGROUND

Metadata in general refers to data about data. Typically, metadata describes how, when and/or by whom a particular set of data was collected. In the context of media applications that use audio and video data, metadata may include ancillary information about a file, a track or stream of media data. For example, metadata about a video stream may include a copyright, creation date and director information. As another example, an audio track in an MP3 (Moving Pictures Expert Group (MPEG)-1 Audio Layer-3) file may include artist, album and song title as metadata. Metadata can be found in the media stream itself, or it can be stored separate from the media data.

Different types of media files may store metadata in many different ways. How metadata is stored is dictated by the format of the media file. For example, in QuickTime® movie files, metadata is stored in a "user data list" within the movie file. The user data list contains one or more user data items. Each user data item in the user data list has a type, (e.g., Author, Copyright, Creation Date, Producer, etc.), associated with it that identifies what type of metadata is contained in that user data item. For example, copyright information may be stored in a '@cpy' user data item. As another example, metadata in an MP3 file is stored in an "ID3" section of the MP3 file. The ID3 "tag" is a fixed-size 128-byte section that resides at the end of MP3 audio files. The ID3 tag includes title, artist, year, genre and comment fields as metadata associated with the song stored in the MP3 file. Later versions of the ID3 metadata format allow for individual pieces of metadata to be interspersed within the MP3 file. Other media file formats and techniques for storing media metadata are known.

Traditionally, applications access metadata information stored in a media file through functions that are specific to the type of the media file. These format-specific functions assume that the metadata is stored in a particular format associated with that file type. For example, an application can access QuickTime movie metadata through functions developed to retrieve user data lists from QuickTime movie files. These functions are QuickTime-format specific, and are only capable of dealing with QuickTime user data.

As use of media data becomes more common, and the number of different types of and formats for media data increases, it becomes important for applications to be able to access different types of media data. For instance, a person creating a movie may use a multi-platform multimedia application to include various types of video, audio and/or text tracks acquired from various sources in the movie. The ability to access metadata from different types of media data also becomes increasingly important as media data becomes more widespread.

One approach for accessing metadata stored in different media data formats is to create a separate set of metadata access functions for each format. This approach is limited as new metadata access functions need to be developed for each particular format as new formats are developed. In addition, as existing formats are updated with newer format versions, the functions to access metadata stored in those formats also need to be updated.

Another approach for accessing metadata stored in different media data formats is to convert the metadata from various media data formats into a common format. In this approach, only one set of metadata access functions are needed, as all metadata is converted to the common format. However, functions that convert the metadata to the common metadata format will still need to be updated as new media file types and formats are introduced and updated. In addition, some metadata may be lost or the fidelity compromised in the conversion as the common format may store data in a different way, or may not provide for every possible type of metadata.

New techniques for accessing metadata stored in various native media data formats are needed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 4A-4E illustrate example segments of pseudo-code that make calls to a media metadata access functions in an API developed in accordance with various embodiments of the present invention.

DETAILED DESCRIPTION

Figure 1:
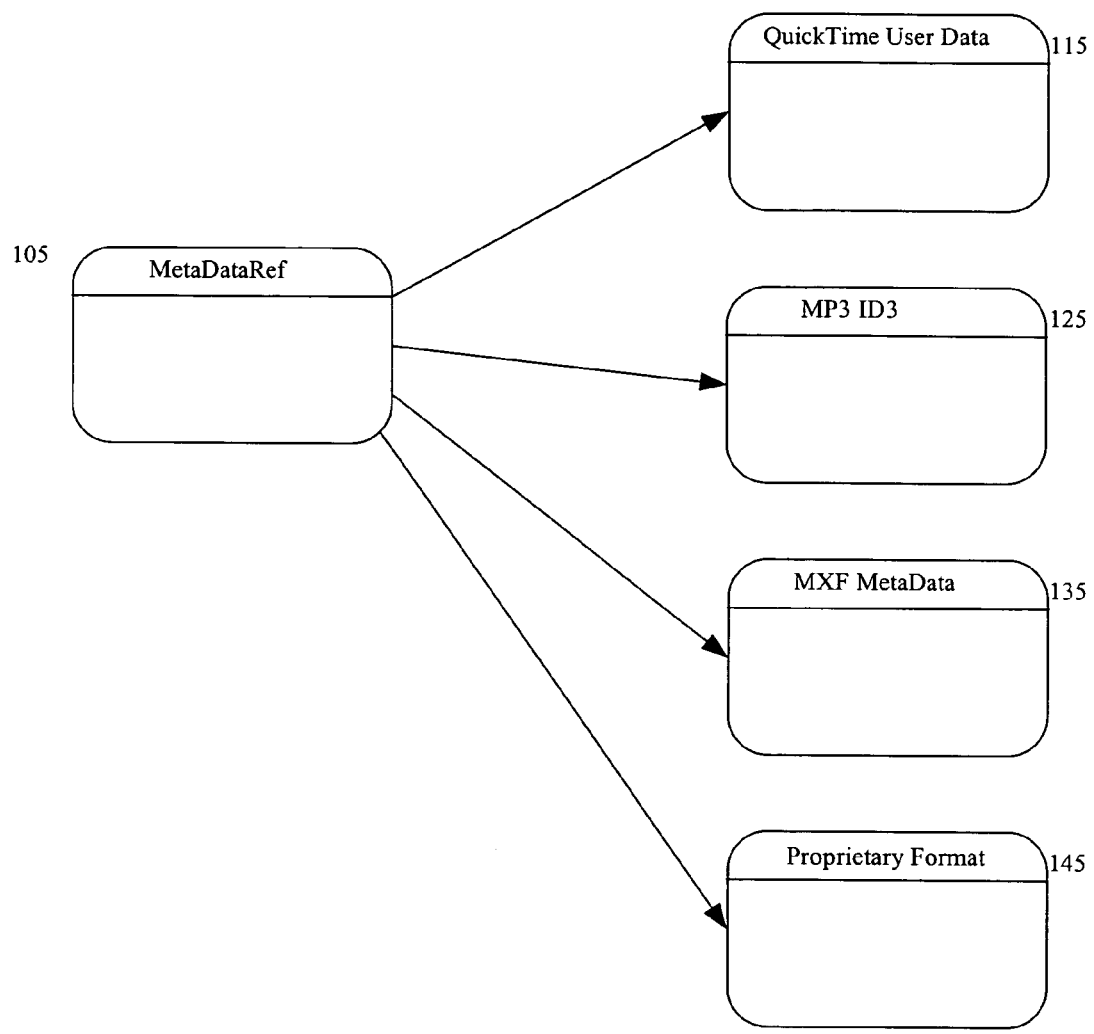
FIG. 1 is a block diagram illustrating a high-level view of a media metadata repository of native format metadata containers.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview of Media Metadata

There are many different types of media used in software applications. For instance, graphics, audio, video, text, music, virtual reality media and three-dimensional media are all types of media that are supported by various software applications. In addition, many media applications support more than one type of media. For instance, a "movie" that can be created and played by a multimedia application may include synchronized audio, video and text tracks.

Consequently, multimedia applications used to create, publish and/or play back various types of media frequently will support a wide variety of formats. Typically, in order to support a variety of formats, multimedia applications will support one or more codecs (compression/decompression algorithms). Codecs in used today include MP3, Interactive Multimedia Association (IMA), Advanced Audio Coding (AAC), Moving Picture Experts Group-4 Part 2 (MPEG-4), and many others. Likewise various media file formats are in use, such as MP3, MPEG-4, Third Generation Partnership Project standards (3GPP, 3GPP2), and many others.

In order to provide support for so many different new and evolving formats, media applications must be continuously updated to support new formats as they are developed and gain acceptance, and to support new versions of existing formats.

Each media format supported by a multimedia application may include various types of metadata stored in various formats. As discussed above, two common media metadata formats include QuickTime user data and the ID3 tag in MP3 files. Another important media format is the Material eXchange Format (MXF) developed by the content creation industry. MXF is a format optimized for the interchange of "clips" (pictures, sound, data, etc.), and allows metadata and media data to be stored in a single file and/or stream. MXF metadata includes duration information, codecs required by the data, timeline complexity information, display size, as well as a wide range of descriptive metadata related to the media content and production (e.g., shot location, list of participants, etc.). There are many other media formats that may include their own sets of metadata. For example, formats based on MPEG-4, such as m4a (MPEG-4 Audio Layer) and m4p (protected Advanced Audio Coding (AAC)) which are specific formats used by iTunes, include their own metadata.

Media metadata, no matter what format it is in, may include at least some information that is commonly stored as media metadata, such as copyright, author, director and producer information. Metadata information supported by only some media metadata formats may include GPS coordinates, or location information. In addition, certain media metadata formats may include information that no other media metadata formats include. Media metadata may include information intrinsic to the media data and/or information directed to the content of the associated media data.

Media metadata is important in many situations, such as enforcing copyright protections, playing back media in a proper manner, and managing "workflow" of media data in an application. Therefore, techniques for accessing the metadata in or associated with media data files are critical.

Accessing Media Metadata

In order to allow developers to access media metadata, an Application Programming Interface (API) is frequently used. Typically, a media metadata access API includes functions or routines for reading, setting, or searching for particular pieces of metadata associated with media data. Media metadata can include many different types of information, therefore a media metadata access API can require a large number of routines in order to allow a developer full access to media metadata.

For instance, a QuickTime media metadata access API would include routines for obtaining a reference to the user data list in a QuickTime file, and for retrieving, creating, copying, setting, removing and modifying user data items in the user data list. An MP3 media metadata access API would include routines for accessing and editing the fields in the ID3 tag in a MP3 file.

However, a format-specific media metadata access API is only capable of accessing metadata stored in that particular format. Multimedia creation, development, storage and playback applications may use metadata from many different types of media files, and therefore support for accessing metadata from multiple types of media data is needed.

One approach for providing access to various types of media metadata stored in different native formats is to create a common media metadata format, and import, convert or translate all metadata from its native format to this common format. In order to preserve all metadata, however, the common metadata format must be a superset of all supported media metadata formats, which presents difficult maintenance issues. In addition, as data may be stored differently, even if the common format includes fields for all known types of metadata information, some information could potentially be lost in the translation to the common format.

Another approach for providing access to various types of media metadata stored in different native formats is to create a separate media metadata access API for each metadata format. However in this approach, a large number of APIs are needed, and a user must use a different API to access metadata for each type of media file. As mentioned above, there are certain pieces of metadata information that are common across various types of media data. Requiring a user to use a first API to access copyright information from one media file, and a second API—with a different interface—to access copyright information from a second media file would be frustrating to developers.

Instead of developing an API for each type and format of media data, or requiring that all metadata be converted into a common format, techniques disclosed herein allow for a single format-independent API that provides access to any type and format of media metadata, even proprietary formats or types not yet developed. An API developed using the disclosed techniques is independent of the format of any underlying media metadata format, and is extensible to accommodate new or proprietary formats. Disclosed techniques allow developers to use the same routine or procedure call to access metadata from media data stored in different formats. For example, the same API routines can be used to access user data metadata in a QuickTime movie file, ID3 metadata in an MP3 file or metadata in m4a and m4p files.

Techniques disclosed herein provide for a single media metadata access API that allows users to find pieces of metadata abstractly, with abstract naming, from media metadata stored in a repository of native format metadata containers without regard or even knowledge of the structure of the native metadata containers.

In one embodiment, media metadata in its native format is encapsulated in an opaque container repository and accessed through a common "MetaDataReference" object. The MetaDataReference object represents the metadata repository which consists of one or more native media metadata containers. Each native media metadata container in a repository is associated with a particular format, such as MP3, MXF, etc. The native metadata containers are not directly accessed. Instead all access is through the MetaDataReference object. A media metadata access API developed using techniques disclosed herein supports unified access to and management of these containers through the MetaDataReference object.

FIG. 1 illustrates an example embodiment of a MetaDataReference object 105 that represents a media metadata repository that includes four different native metadata containers: QuickTime user data container 115, MP3 ID3 metadata container 125, MXF metadata container 135, and metadata in a proprietary format container 145. As will be apparent to one skilled in the art, a media metadata repository could include more or fewer native metadata containers, and could include types of native metadata containers not shown in FIG. 1.

Although not shown in FIG. 1, the MetaDataReference object 105 may have certain properties associated with it. For instance, MetaDataReference object properties could include an identifier of an owner of the MetaDataReference object, a level or type of owner (e.g., movie, track, media), and a list of supported native formats associated with the MetaDataReference object.

Each native metadata container in the metadata repository includes one or more "metadata items" for the media data item associated with the metadata container. A metadata item, as used herein, refers to a discrete piece of metadata in a native metadata container. For example, copyright information may be a metadata item. Creation date information may be a metadata item. Each metadata item has one or more characteristics, attributes, or properties (herein termed "properties"), such as a key, a data type, value format, locale information, etc. Metadata item properties are discussed in more detail below. A metadata item is assigned a runtime identifier that, along with the MetaDataReference object, identifies the particular metadata item across all native metadata containers managed by the MetaDataReference object.

Figure 2:
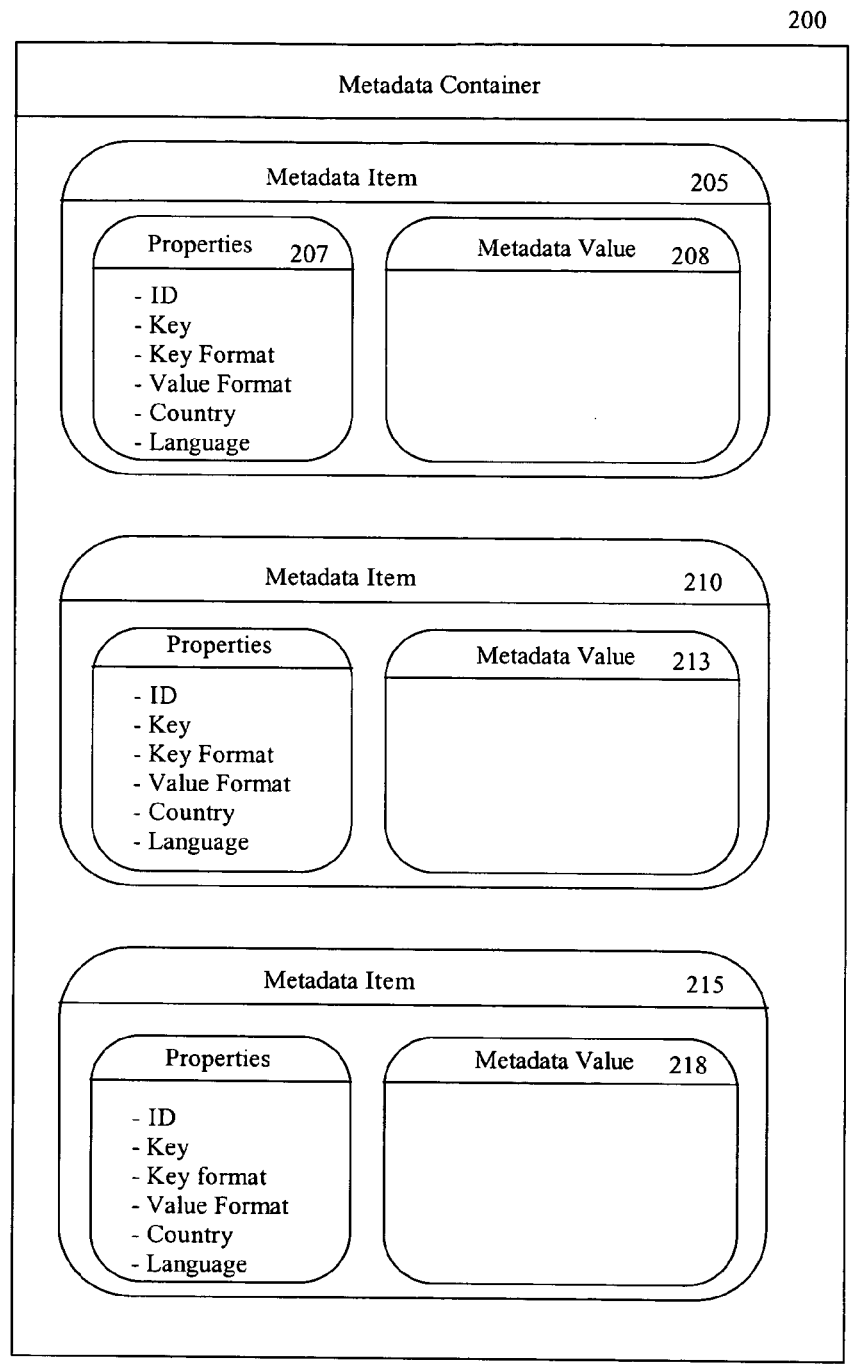
FIG. 2 is a block diagram illustrating an example embodiment of metadata items stored in a native format metadata container.

FIG. 2 illustrates an example embodiment of a native metadata container 200 that includes three metadata items 205, 210, and 215. As will be apparent to those skilled in the art, a metadata native container may include more or fewer metadata items.

In the example of FIG. 2, each metadata item has a set of properties associated with it, as shown by property list 207. In the example of FIG. 2, these metadata item properties include an Item ID, a key, a key format, a value format, a country and a language. The properties of a metadata item are typically characteristics that all pieces of metadata have, no matter which native format they are stored in. However, it is not required that all metadata items have values set for each of the properties. For example, some native formats may not support different languages, and the language property for metadata items in these containers may not have values, or may all be set to a default value. As will be apparent to those of skill in the art, more or fewer metadata item properties than those listed in FIG. 2 can be used.

The Item ID property is an identifier determined at runtime for each metadata item, and the Item ID for each metadata item is unique within a repository, as mentioned above. The Item ID along with the MetaDataReference object identifies a particular metadata item (and value for the metadata item) across all native containers managed by the MetaDataReference object.

Each metadata item 205, 210 and 215 includes a value, as shown by metadata values 208, 213, 218 respectively. No details of the value are shown in FIG. 2, and the value for a metadata item is not limited to any particular size or type of format. The value format of one metadata item in a native metadata container may be completely different than the value format of another metadata item in the same metadata container. For example, the value format property of metadata item 205 may indicate a floating point datatype, and the value 208 of metadata item 205 may be set to the number 15.25. Metadata item 215 may have a string value format property, and may have a value of "UA-1234a." Many different types of formats known to those skilled in the art can be used as a value format for a metadata item.

In addition, in one embodiment a metadata value may reference data outside the container itself. In effect, in this embodiment, the value indicates the external container, location and/or size of the data.

The language and country properties are used when a metadata item, such as copyright, has different values depending on the location, etc. of a user. For example, a string that identifies the copyright information in English could be set as the value for a copyright metadata item for when the country property is "USA" and the language property is "English", and a string that identifies the copyright information in French could be set as the value for the copyright metadata item for when the country property is "France" and the language property is "French."

The "key" property of a metadata item is used to address a particular metadata item within a native metadata container. In one embodiment, a key is not necessarily unique within its container, as it is possible to have multiple metadata items with the same key. For example, a native metadata container may contain multiple metadata items with an "author" key when the associated media data has multiple authors.

In one embodiment, keys in different metadata containers may have different structures. For example, MXF files use 16-byte binary keys, and QuickTime User Data uses four-character codes. In addition, keys within the same native format metadata container may have different structures. For example, MPEG-4 format based files, such as iTunes m4a and m4p files, may use both four-character codes and short strings as key formats. Therefore, as will be illustrated in the examples below, in one embodiment, the structure of a key as well as the value of the key is used to address a metadata item. Any type of structure or format, such as reverse DNS format or any other known to those skilled in the art, can be used as a key property structure. The keys used in the native metadata containers are sometimes called "native keys" as they are determined by the native format of the metadata.

Each native metadata container can be addressed by its storage format. Each metadata item within a container can be addressed through its key property. In order to access a metadata item, the native key is used in conjunction with an identification of the type of native storage format of the container to describe and access any type of metadata, no matter which native format is used to store the metadata. The examples given herein describe various techniques for accessing a metadata item using a native storage format in conjunction with a native key.

Exemplary Systems

FIGS. 4A and 4B illustrate two specific examples of how the same API functions can be used to obtain the value of a metadata item from metadata stored in different native metadata containers. FIG. 4A illustrates a segment of pseudo-code for accessing a copyright metadata item from a QuickTime movie file, and FIG. 4B illustrates a segment of pseudo-code for accessing a copyright metadata item from a .m4a format media data file. (Files in .m4a format are actually the audio layer of non-video MPEG-4 movies.) The methods of FIGS. 4A and 4B call exactly the same media metadata access functions of the unified metadata access API. Only the values of the parameters are different.

In each example, a MetaDataReference object is created and initialized, as shown by function calls 420A and 420B. This object will reference the repository of native metadata containers. In these examples, the MetaDataReference object is created from metadata in movie files, however the MetaDataReference object can also be created for metadata in other types of media.

Next, the first copyright metadata item in each native metadata container is obtained at steps 430A and 430B respectively. As shown, at step 430A and at step 430B, the function GetNextMetaDataItem is called. However, the values of the parameters are different for the calls in steps 430A and 430B.

In this example embodiment, the function GetNextMetaDataItem requires seven parameters. The first parameter is the MetaDataReference object. In both steps 430A and 430B, the MetaDataReference object created in steps 420A and 420B respectively is passed to the GetNextMetaDataItem as the first parameter.

The second parameter identifies the metadata storage format for the GetNextMetaDataItem function. This is the parameter that identifies which native metadata container within the repository referenced by the MetaDataReference object created in steps 420A and 420B (i.e., theMetaData) is being accessed. In FIG. 4A, the metadata storage format is identified as QuickTime user data (UserDataStorageFormat), and in FIG. 4B, the metadata storage format is identified as m4a metadata (M4aStorageFormat). In FIG. 4A, the constant UserDataStorageFormat has been initialized to the four-character code 'udta' in initialization section 410A. In FIG. 4B, the m4aStorageFormat has been initialized to the four-character code 'itms'. While four-character codes are used in these examples, these could have different formats, such as integer or string.

The media metadata access API recognizes the same constants that were defined in the initialization sections 410A and 410B. As those skilled in the art will appreciate, the constants do not have to be explicitly defined in the code as shown in FIGS. 4A and 4B, and are preferably defined in a separate header file that is used by the API functions themselves, and the constants are global or well-known constants.

The third parameter identifies the current metadata item. In this example, as it is the first copyright metadata item within the container identified by the second parameter that is to be accessed, the current metadata item has been set to a predefined "uninitialized" value in both FIGS. 4A and 4B. This indicates to the function that the first piece of metadata in the specified container that matches the parameters is to be accessed. If a metadata item has already been accessed, this parameter could be set to the identifier of that metadata item instead of the uninitialized value, and the next metadata item after the first matching metadata item that matches the parameters is accessed in a call to GetNextMetaDataItem.

The fourth parameter identifies the format of the key. The format of the key is specific to the type of native storage format, identified in the second parameter. As shown in FIG. 4A, the format of the key is set to the UserDataKeyFormat, which has been defined as four-character code 'udta' in initialization section 410A. Code 'udta' has been defined to refer to a four-character code format in this embodiment. In FIG. 4B, the format of the key is set to the m4aKeyFormat, which has been set to the four-character code 'itkl' in initialization section 410B. Code 'itkl' has been defined to refer to a reverse DNS format string in this embodiment. As with the data storage formats, the API functions recognize the same constants that are used in the API function call.

The fifth parameter identifies a pointer to the bytes containing a value for metadata item key. As discussed above, the format of the key is dictated by the native storage format. In FIG. 4A, the key has been defined as the four-character code 'cprt' which is the key that QuickTime user data recognizes as a property for copyright metadata items. In FIG. 4B, the key has been defined as the reverse DNS expression "com.apple.m4a.copyright." As shown, the native key itself is passed transparently through the unified media metadata access API call. While the key is passed to native metadata format-aware code, the API itself does not have to understand the key or its format. In addition, if the format or value of a key changes, no changes are needed to the API, as the key is passed transparently as a parameter.

The sixth parameter identifies the size of the key used as the fifth parameter. This allows the GetNextMetaDataItem function to use native keys of different formats and of different sizes.

The seventh parameter is used to return the identifier of the next metadata item that matches the first six parameters. Since an UninitializedMetaDataItem was passed as the third parameter, in these examples the first metadata item in the specified container with the specified key is returned. If instead a reference to a current metadata item had been passed as the third parameter, the next item with the key after the passed-in current item would have been returned.

As shown by these examples, any type of native data format can be specified, and any type of key format for a metadata item can be specified as parameters in the API function call.

As shown by steps 440A and 440B respectively, the metadata item identifier determined by the GetNextDataItem call in 430A and 430B respectively is used to retrieve the value of the first metadata item in the specified native data format container whose key property matches the key value specified in the call (i.e., the value of the metadata item identified in the steps 430A and 430B respectively). Again, the same function (GetMetaDataItemValue) is used in both FIGS. 4A and 4B.

As shown, the first parameter used in steps 440A and 440B is the MetaDataReference object created in steps 420A and 420B, respectively, and the second parameter is the metadata item identifier determined in steps 430A and 430B respectively. The other parameters are used to create a buffer that contains the value of the matching metadata item. In FIGS. 4A and 4B, the first value of the identified metadata item is returned in the buffer. As shown by FIG. 4D, discussed below, a metadata item may have more than one value.

As shown by FIGS. 4A and 4B, a particular key value can be used to find metadata items within a native format container having that value as its key property. In one embodiment, it is also possible to enumerate all metadata items within a container, regardless of the value of the key property of the metadata items. For example, a NULL key could be passed as the fifth parameter.

The media metadata access API may also include functions for changing the value of a metadata item. FIG. 4C illustrates an example embodiment. As shown in initialization section 410C, a buffer has been initialized to the new copyright string. As in FIG. 4A, a MetaDataReference object is created in step 420C, and the first copyright metadata item (i.e. the first metadata item in the user data native format container with a key property of 'cprt') is retrieved in step 430C. In step 440C, the API function SetMetaDataItem is called to change the value of the identified copyright metadata item.

FIG. 4D illustrates an example of how the unified metadata access API can be used to retrieve the value of a copyright metadata item in French in an embodiment in which multiple languages are supported. In this example, the native format supports Locale tagging, however, Locale tagging is not required. As shown in this example, the MetaDataReference object is created in step 420D, and the first copyright metadata item in the specified native metadata container (in this example, the user data container) is retrieved at step 430D. The first metadata item is retrieved, as the parameter "theItem" was initialized to the UninitializedMetaDataItem in the initialization section, thereby instructing the GetNextMetaDataItem function to retrieve the first matching metadata item.

At step 440D, API function GetMetaDataItemProperty is called with parameters that identify the MetaDataReference object created in step 420D, and the matching copyright metadata item identified in step 430D. The third parameter specified that the "Locale" property of the metadata item is to be returned. The function GetMetaDataItemProperty will then return the value of the "Locale" property for the metadata item identified in the first two parameters through the Locale parameter.

At step 450D, it is determined whether the returned value of the Locale property of the current metadata item matches the pre-defined value for a French property. If so, then the value of the current metadata item is retrieved at step 460D. Otherwise, as shown by step 470D, the next copyright metadata item in the identified native format metadata container is retrieved at step 430D.

As shown, unlike FIGS. 4A-4C, the third parameter for the GetNextMetaDataItem function specifies the current metadata item (i.e. theItem). In the first iteration of the loop, "theItem" is set to the UninitializedMetaDataItem, as shown in the initialization section. Therefore, at step 430D the first matching metadata item is retrieved in the first iteration, and set as the current metadata item. Each iteration thereafter will retrieve the next matching metadata item, and set it as the current metadata item. The properties of each copyright metadata item are retrieved and evaluated until a matching a property matches the predefined French property, or until there are no more copyright metadata items.

FIGS. 4A-4D illustrate only a few of the possible functions a unified media metadata access API could include. The API could also include functions for persistently maintaining a MetaDataReference object, releasing a MetaDataReference object from memory, reading property information about a MetaDataReference object (e.g., owner, type of owner, list of supported formats, etc.), setting property values for a MetaDataReference object, adding properties to the MetaDataReference object, reading property information about a metadata item (e.g., key, language, locale, etc.), setting property values for a metadata item, adding a property to a metadata item, counting a number of metadata items that match a particular key, determining the size of a metadata item value, adding a metadata item to a container, removing a metadata item from a container, creating a new container, etc. Many other unified metadata access and management functions will be apparent to those skilled in the art.

FIGS. 4A-4D illustrate embodiments in which native format metadata structures and key structures are predefined and well-known. However, as will be apparent to those skilled in the art, a user can create or modify the native format structure, key structure or key value at any time. That is, users can extend the application of the API by defining or modifying formats, key structures or value. The API itself does not need to change when new native formats are created or when keys change. The techniques disclosed herein allow for an extensible solution for accessing metadata in native metadata containers.

Wildcard Access to Common Metadata Items

The above-described examples illustrated methods for accessing metadata in a native format container using a native key format. To allow unified access across disparate containers, a wildcard storage format can be specified in one embodiment. This format can be used to direct searches across various native container formats.

As discussed above, many pieces of media metadata are common across native formats. For example, almost all native formats have copyright, author, display name, producer and keywords as pieces of metadata, although they may be stored in different formats and have different key values. In one embodiment, a special "CommonKeyFormat" is predefined to indicate a set of common keys that can be handled by well-known native containers. The CommonKeyFormat is a predefined format that applies across more than one native format.

FIG. 4E illustrates example pseudo-code for retrieving the copyright metadata items across multiple native format containers using the wildcard format and the common key format. As shown, at step 420E, the MetaDataReference object is created. At step 430E, the function GetNextMetaDataItem is called. The parameters for the GetNextMetaDataItem function in this example include the predefined StorageFormatWildcard value to indicate to the GetNextMetaDataItem function that all native format containers are to be searched, and the CommonKeyFormat value to indicate to the GetNextMetaDataItem function that the common key format is to be used to access the keys.

Hardware Overview

Figure 3:
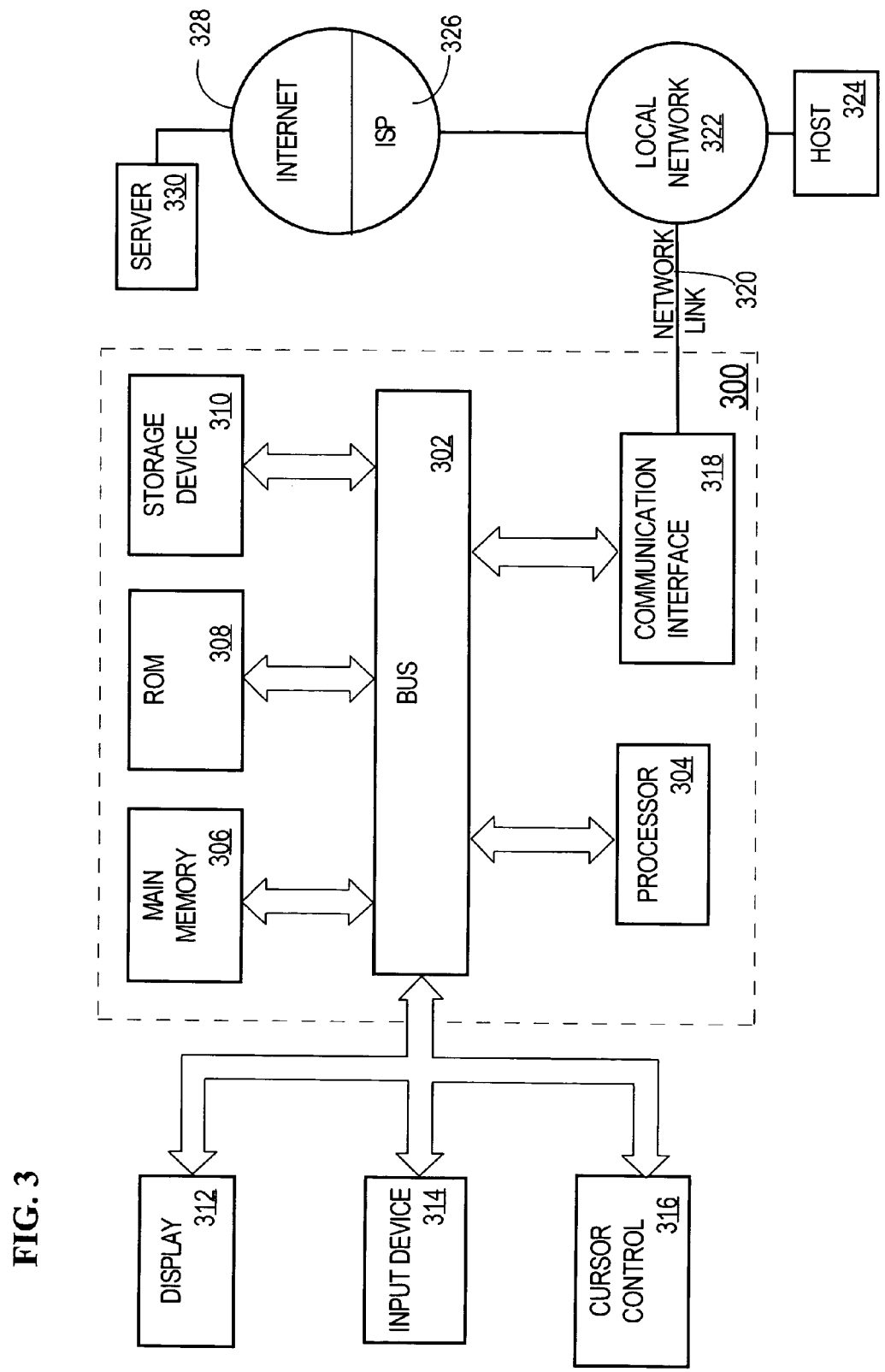
FIG. 3 is a block diagram illustrating a computer system upon which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

Extensions and Alternatives

In the foregoing specification, the invention has been described with reference to specific embodiments thereof. It will, however, be evident that various modifications and changes may be made thereto without departing from the broader spirit and scope of the invention. For example, while the invention has been described using media metadata as an specific example, the techniques disclosed herein can be used to extract metadata from any data that contains metadata, and is not limited to media files or media metadata, or any particular file format. That is, the techniques disclosed herein can be used to access metadata from any type of non-media data that can potentially be stored in a disparate native formats as well as media data stored in disparate native formats.

The sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for enabling metadata to be accessed from a metadata repository, wherein the metadata repository comprises a plurality of metadata containers, each container associated with a different native metadata format and containing metadata items having the associated native metadata format, the method comprising:

receiving, by a routine, a first request from a first application to access metadata from the repository, the first request causing a set of parameters to be passed in to the routine that includes:
information indicating a particular native metadata format; and
a particular metadata item key, wherein the particular metadata item key is a native key having a value and a format dictated by the particular native metadata format;

in response to the first request, causing a search of the metadata repository to be performed to find one or more metadata items that satisfy the particular metadata item key;

providing to the first application information pertaining to a metadata item that has been found to satisfy the particular metadata item key;

receiving, by the same routine, a second request from a second application to access metadata from the repository, the second request causing a set of parameters to be passed in to the routine that includes:
information indicating a certain native metadata format which is different from the particular native metadata format; and
a certain metadata item key, wherein the certain metadata item key is a native key having a value and a format dictated by the certain native metadata format;

in response to the second request, causing a search of the metadata repository to be performed to find one or more metadata items that satisfy the certain metadata item key; and providing to the second application information pertaining to a metadata item that has been found to satisfy the certain metadata item key;

wherein the first and second applications may be the same or different applications; and wherein the method is performed by one or more computing devices.

2. The method of claim 1, wherein the first request causes the following additional parameter to be passed in to the routine:

a reference to a metadata reference object that represents the metadata repository and through which the metadata repository is accessed.

3. The method of claim 1, wherein the first request causes the following additional parameter to be passed in to the routine:

information indicating a structure for the particular metadata item key;

wherein the structure for the particular metadata item key is specific to the particular native metadata format.

4. The method of claim 3, wherein the first request causes the following additional parameter to be passed in to the routine:

information indicating a size of the particular metadata item key.

5. The method of claim 1, wherein the information provided to the first application comprises a reference to a first metadata item, and wherein the method further comprises:

receiving a third request from the first application to obtain a value associated with the first metadata item, the third request causing a set of parameters to be passed in that includes:

the reference to the first metadata item;

in response to the third request, causing the metadata repository to be accessed to obtain a value associated with the first metadata item; and providing to the first application the value associated with the first metadata item.

6. The method of claim 1, wherein the information provided to the first application comprises a reference to a first metadata item, and wherein the method further comprises:

receiving a third request from the first application to associate a new value with the first metadata item, the third request causing a set of parameters to be passed in that includes:

the reference to the first metadata item; and information indicating the new value;

in response to the third request, causing the first metadata item to be accessed and causing the new value to be stored into the metadata repository in association with the first metadata item.

7. The method of claim 1, wherein the information provided to the first application comprises a reference to a first metadata item, and wherein the method further comprises:

receiving a third request from the first application to find a next metadata item in the metadata repository that satisfies the particular metadata item key, the third request causing a set of parameters to be passed in that includes:

information indicating the particular native metadata format;

the reference to the first metadata item; and the particular metadata item key;

in response to the third request, causing a search of the metadata repository to be performed to find a next metadata item that satisfies the particular metadata item key; and providing to the first application information pertaining to a second metadata item that has been found to satisfy the particular metadata item key.

8. The method of claim 1, further comprising:

receiving a third request to access metadata from the repository, the third request causing a set of parameters to be passed in that includes:

a wildcard metadata format indicator;

a common metadata item key; and information indicating that the common metadata item key is in a common key format;

in response to the third request, causing a search of the metadata repository to be performed to find one or more metadata items that satisfy the common metadata item key, wherein all of the containers in the metadata repository are searched; and providing to a sender of the third request information pertaining to a metadata item that has been found to satisfy the common metadata item key.

9. A machine-readable storage medium storing instructions which, when executed by one or more processors, cause the one or more processors to perform the method of claim 1.

10. A machine-readable storage medium storing instructions which, when executed by one or more processors, cause the one or more processors to perform the method of claim 2.

11. A machine-readable storage medium storing instructions which, when executed by one or more processors, cause the one or more processors to perform the method of claim 3.

12. A machine-readable storage medium storing instructions which, when executed by one or more processors, cause the one or more processors to perform the method of claim 4.

13. A machine-readable storage medium storing instructions which, when executed by one or more processors, cause the one or more processors to perform the method of claim 5.

14. A machine-readable storage medium storing instructions which, when executed by one or more processors, cause the one or more processors to perform the method of claim 6.

15. A machine-readable storage medium storing instructions which, when executed by one or more processors, cause the one or more processors to perform the method of claim 7.

16. A machine-readable storage medium storing instructions which, when executed by one or more processors, cause the one or more processors to perform the method of claim 8.

17. A system comprising:

a metadata repository comprising a plurality of metadata containers, each container associated with a different native metadata format and containing metadata items having the associated native metadata format; and a metadata interface comprising a routine that enables metadata in the metadata repository to be accessed regardless of the native metadata format of the metadata, the routine configured to operate as follows:

receiving a first request from a first application to access metadata from the repository, the first request causing a set of parameters to be passed in to the routine that includes:

information indicating a particular native metadata format; and a particular metadata item key, wherein the particular metadata item key is a native key having a value and a format dictated by the particular native metadata format;

in response to the first request, causing a search of the metadata repository to be performed to find one or more metadata items that satisfy the particular metadata item key; and providing to the first application information pertaining to a metadata item that has been found to satisfy the particular metadata item key;

receiving a second request from a second application to access metadata from the repository, the second request causing a set of parameters to be passed in to the routine that includes:

information indicating a certain native metadata format which is different from the particular native metadata format; and a certain metadata item key, wherein the certain metadata item key is a native key having a value and a format dictated by the certain native metadata format;

in response to the second request, causing a search of the metadata repository to be performed to find one or more metadata items that satisfy the certain metadata item key; and providing to the second application information pertaining to a metadata item that has been found to satisfy the certain metadata item key;

wherein the first and second applications may be the same or different applications.

18. The system of claim 17, wherein the first request causes the following additional parameter to be passed in to the routine:

a reference to a metadata reference object that represents the metadata repository and through which the metadata repository is accessed.

19. The system of claim 17, wherein the first request causes the following additional parameter to be passed in to the routine:

information indicating a structure for the particular metadata item key;

wherein the structure for the particular metadata item key is specific to the particular native metadata format.

20. The system of claim 19, wherein the first request causes the following additional parameter to be passed in to the routine:

information indicating a size of the particular metadata item key.

21. The system of claim 17, wherein the information provided to the first application comprises a reference to a first metadata item, wherein the metadata interface further comprises a second routine, and wherein the second routine is configured to operate as follows:

receiving a third request from the first application to obtain a value associated with the first metadata item, the third request causing a set of parameters to be passed in to the second routine that includes:

the reference to the first metadata item;

in response to the third request, causing the metadata repository to be accessed to obtain a value associated with the first metadata item; and providing to the first application the value associated with the first metadata item.

22. The system of claim 17, wherein the information provided to the first application comprises a reference to a first metadata item, wherein the metadata interface further comprises a second routine, and wherein the second routine is configured to operate as follows:

receiving a third request from the first application to associate a new value with the first metadata item, the third request causing a set of parameters to be passed in to the second routine that includes:

the reference to the first metadata item; and information indicating the new value;

in response to the third request, causing the first metadata item to be accessed and causing the new value to be stored into the metadata repository in association with the first metadata item.

23. The system of claim 17, wherein the information provided to the first application comprises a reference to a first metadata item, and wherein the routine is further configured to operate as follows:

receiving a third request from the first application to find a next metadata item in the metadata repository that satisfies the particular metadata item key, the third request causing a set of parameters to be passed in to the routine that includes:

information indicating the particular native metadata format;

the reference to the first metadata item; and the particular metadata item key;

in response to the third request, causing a search of the metadata repository to be performed to find a next metadata item that satisfies the particular metadata item key; and providing to the first application information pertaining to a second metadata item that has been found to satisfy the particular metadata item key.

24. The system of claim 17, wherein the routine is further configured to operate as follows:

receiving a third request to access metadata from the repository, the third request causing a set of parameters to be passed in to the routine that includes:

a wildcard metadata format indicator;

a common metadata item key; and information indicating that the common metadata item key is in a common key format;

in response to the third request, causing a search of the metadata repository to be performed to find one or more metadata items that satisfy the common metadata item key, wherein all of the containers in the metadata repository are searched; and providing to a sender of the third request information pertaining to a metadata item that has been found to satisfy the common metadata item key.

* * * * *